(12) United States Patent
Du et al.

(10) Patent No.: US 10,277,804 B2
(45) Date of Patent: Apr. 30, 2019

(54) METHOD AND TERMINAL FOR ACQUIRING PANORAMIC IMAGE

(71) Applicant: Huawei Device Co., Ltd., Dongguan (CN)

(72) Inventors: Cheng Du, Beijing (CN); Wei Su, Shanghai (CN); Wei Luo, Shanghai (CN); Bin Deng, Shenzhen (CN); Landi Li, Shanghai (CN)

(73) Assignee: Huawei Device Co., Ltd., Dongguan (CN)

( * ) Notice: Subject to any disclaimer, the term of this patent is extended or adjusted under 35 U.S.C. 154(b) by 31 days.

(21) Appl. No.: 14/984,316

(22) Filed: Dec. 30, 2015

(65) Prior Publication Data

US 2016/0112632 A1 Apr. 21, 2016

Related U.S. Application Data

(63) Continuation of application No. PCT/CN2013/089411, filed on Dec. 13, 2013.

(51) Int. Cl.
*H04N 5/232* (2006.01)
*G06K 9/46* (2006.01)
(Continued)

(52) U.S. Cl.
CPC ......... *H04N 5/23222* (2013.01); *G03B 37/02* (2013.01); *G06K 9/4671* (2013.01);
(Continued)

(58) Field of Classification Search
CPC .......... H04N 5/23222; H04N 5/23238; H04N 5/23296; G06T 7/0044; G06T 7/0018;
(Continued)

(56) References Cited

U.S. PATENT DOCUMENTS

| 7,317,486 B2 | 1/2008 | Toyofuku et al. |
| 7,920,161 B2 | 4/2011 | Niemi et al. |

(Continued)

FOREIGN PATENT DOCUMENTS

| CN | 101063804 A | 10/2007 |
| CN | 101093348 A | 12/2007 |

(Continued)

OTHER PUBLICATIONS

International Search Report dated Sep. 22, 2014 in corresponding international application PCT/CN2013/089411.
(Continued)

*Primary Examiner* — Zaihan Jiang
(74) *Attorney, Agent, or Firm* — Yeh Kurt Chang

(57) ABSTRACT

A method includes: after a panorama shooting instruction triggered by a user is acquired, shooting a first image, and acquiring a shooting parameter of the first image; determining move guiding information according to a preset move guiding policy, and displaying the move guiding information on a terminal, so as to instruct the user to move the terminal according to the move guiding information; shooting a preset quantity of images according to the shooting parameter of the first image after it is detected that the terminal moves, where the preset quantity of images are background images on both the left and right sides of a background corresponding to the first image; and performing, by using the first image as a center and by using a preset splicing scheme, seamless splicing on the first image and the preset quantity of images, to obtain a panoramic image.

13 Claims, 7 Drawing Sheets

(51) Int. Cl.
*G06K 9/62* (2006.01)
*G06T 7/00* (2017.01)
*G03B 37/02* (2006.01)
*G06T 7/80* (2017.01)
*G06T 7/73* (2017.01)

(52) U.S. Cl.
CPC .............. *G06K 9/6215* (2013.01); *G06T 7/74* (2017.01); *G06T 7/80* (2017.01); *H04N 5/23238* (2013.01); *H04N 5/23296* (2013.01); *G06T 2207/10016* (2013.01); *G06T 2207/30244* (2013.01)

(58) Field of Classification Search
CPC ........... G06T 2207/30244; G06T 2207/10016; G06K 9/4671; G06K 9/6215
USPC ........................................................... 348/36
See application file for complete search history.

(56) References Cited

U.S. PATENT DOCUMENTS

| | | | |
|---|---|---|---|
| 2003/0095193 A1* | 5/2003 | May | G03B 37/02 348/231.3 |
| 2005/0099494 A1 | 5/2005 | Deng et al. | |
| 2007/0253698 A1 | 11/2007 | Park et al. | |
| 2007/0297693 A1 | 12/2007 | Lee | |
| 2008/0192125 A1 | 8/2008 | Kang et al. | |
| 2009/0022422 A1* | 1/2009 | Sorek | G06T 3/4038 382/284 |
| 2009/0040292 A1 | 2/2009 | Miyata | |
| 2009/0153685 A1* | 6/2009 | Son | H04N 5/232 348/208.99 |
| 2009/0167934 A1 | 7/2009 | Gupta | |
| 2010/0066810 A1 | 3/2010 | Ryu et al. | |
| 2010/0073519 A1* | 3/2010 | Onoe | G06F 17/30781 348/231.99 |
| 2010/0265313 A1 | 10/2010 | Liu et al. | |
| 2011/0085027 A1 | 4/2011 | Yamashita et al. | |
| 2011/0157301 A1 | 6/2011 | Saitou et al. | |
| 2011/0228044 A1 | 9/2011 | Miyamoto et al. | |
| 2011/0267530 A1* | 11/2011 | Chun | G06F 3/04883 348/333.11 |
| 2012/0105682 A1 | 5/2012 | Hata et al. | |
| 2012/0120187 A1 | 5/2012 | Goto et al. | |
| 2012/0274738 A1 | 11/2012 | Shi et al. | |
| 2012/0293607 A1 | 11/2012 | Bhogal et al. | |
| 2013/0004100 A1 | 1/2013 | Putraya et al. | |
| 2013/0033567 A1 | 2/2013 | Jeong et al. | |
| 2013/0050407 A1 | 2/2013 | Brinda et al. | |
| 2013/0083159 A1 | 4/2013 | Ooshima | |
| 2013/0113875 A1 | 5/2013 | Ooshima | |
| 2013/0258122 A1 | 10/2013 | Keane et al. | |
| 2014/0240454 A1 | 8/2014 | Hirata et al. | |
| 2014/0267594 A1 | 9/2014 | Furumura et al. | |
| 2014/0285617 A1 | 9/2014 | Arai et al. | |
| 2014/0293002 A1* | 10/2014 | Furumura | G03B 17/18 348/36 |
| 2014/0300693 A1* | 10/2014 | Hirata | H04N 5/23216 348/39 |
| 2014/0320594 A1* | 10/2014 | Park | H04N 5/23238 348/36 |
| 2014/0347501 A1* | 11/2014 | Ishida | H04N 5/23219 348/207.1 |
| 2014/0351763 A1* | 11/2014 | Lee | G03B 37/00 715/838 |
| 2014/0375760 A1* | 12/2014 | Lee | H04N 5/23238 348/36 |
| 2015/0103139 A1 | 4/2015 | Xie | |
| 2015/0249786 A1 | 9/2015 | Williams et al. | |
| 2016/0112632 A1 | 4/2016 | Du et al. | |
| 2017/0310864 A1 | 10/2017 | Jeong et al. | |

FOREIGN PATENT DOCUMENTS

| | | |
|---|---|---|
| CN | 101212575 A | 7/2008 |
| CN | 101867720 | 10/2010 |
| CN | 101872113 A | 10/2010 |
| CN | 102045501 A | 5/2011 |
| CN | 102111545 A | 6/2011 |
| CN | 102209097 A | 10/2011 |
| CN | 102209197 A | 10/2011 |
| CN | 102420898 A | 4/2012 |
| CN | 102645836 A | 8/2012 |
| CN | 102645837 A | 8/2012 |
| CN | 102959943 A | 3/2013 |
| CN | 103179347 A | 6/2013 |
| CN | 104995558 B | 12/2016 |
| EP | 2 164 244 A1 | 3/2010 |
| EP | 2 563 009 A1 | 2/2013 |
| EP | 1850583 B1 | 12/2013 |
| JP | 2000-175185 | 6/2000 |
| JP | 2001-54008 | 2/2001 |
| JP | 200136898 | 2/2001 |
| JP | 200227312 | 1/2002 |
| JP | 2005151563 A | 6/2005 |
| JP | 2007318648 | 12/2007 |
| JP | 200944312 | 2/2009 |
| JP | 200960278 | 3/2009 |
| JP | 2012099917 A | 5/2012 |
| JP | 2012105121 | 5/2012 |
| JP | 2012105122 | 5/2012 |
| JP | 2012182582 A | 9/2012 |
| JP | 201334158 | 2/2013 |
| KR | 10-2007-0105108 | 10/2007 |
| KR | 1020100031263 | 3/2010 |
| KR | 10-2012-0062918 | 6/2012 |
| WO | 2007/042073 A1 | 4/2007 |
| WO | 2012002046 A1 | 1/2012 |
| WO | 2013069047 A1 | 5/2013 |
| WO | 2013069050 A1 | 5/2013 |
| WO | 2013/085512 A1 | 6/2013 |
| WO | 2015085589 A1 | 6/2015 |

OTHER PUBLICATIONS

Search Report, dated Apr. 25, 2016, in corresponding Chinese Application No. 201380073251.6 (8 pp.).
International Search Report dated Sep. 22, 2014 in corresponding International Patent Application No. PCT/CN2013/089411.
Extended European Search Report dated May 23, 2016 in corresponding European Patent Application No. 13899065.0.
Ozawa et al. "Human-centric Panoramic Imaging Stitching", Proceedings of the 3$^{rd}$ Augmented Human International Conference, Mar. 8-9, 2012, Megève, France, 6 Pages.
Pollefeys et al. "Self-Calibration and Metric Reconstruction Inspite of Varying and Unknown Intrinsic Camera Parameters", International Journal of Computer Vision, vol. 32, No. 1, Kluwer Academic Publishers, 1999, The Netherlands, 20 pages.
Office Action, dated May 9, 2017, in Japanese Application No. 2016-537082 (17 pp.).
Notice to Submit a Response, dated Jun. 9, 2017, in Korean Application No. 10-2017-7009135 (8 pp.).
Korean Office Action dated Oct. 13, 2016 in corresponding Korean Patent Application No. 10-2016-7001115.

* cited by examiner

METHOD AND TERMINAL FOR ACQUIRING PANORAMIC IMAGE

CROSS-REFERENCE TO RELATED APPLICATIONS

This application is a continuation of International Application No. PCT/CN2013/089411, filed on Dec. 13, 2013, which is hereby incorporated by reference in their entireties.

TECHNICAL FIELD

Embodiments of the present invention relate to the field of image processing technologies, and in particular, to a method and terminal for acquiring a panoramic image.

BACKGROUND

A rear-facing panorama shooting mode is a shooting mode commonly used in existing smartphones. The rear-facing panorama shooting mode is to move a shooting terminal in a direction to shoot multiple photos, and splice the multiple photos into an image with a larger visual angle.

When a single person goes out for traveling and wants to take a photo with a scene, generally, the person has to ask another person for help, which is inconvenient. If the person wants to take a selfie, generally, a photo that includes only the face of the person can be shot, and it is difficult to shoot a photo that includes an entire background of a scene.

When multiple persons get together and want to take a group photo, a photo that includes all persons cannot be shot even by using a selfie mode, which makes a trouble for users.

The inventor of the present invention finds that there is no front-facing panorama shooting mode in the prior art, even if a rear-facing panoramic mode in the prior art is applied to a front-facing shooting mode, a shooting terminal is moved in only one direction during shooting, so as to shoot multiple photos to obtain a photo with a large visual angle. In this way, when shooting is started from a person, a scene on only one side of the person can be shot; when shooting is started from a scene, a person cannot be highlighted, thereby reducing a shooting effect.

SUMMARY

Embodiments of the present invention provide a method for acquiring a panoramic image, which can highlight an image at a central position during panorama shooting, thereby improving an overall effect of the panoramic image. Embodiments of the present invention further provide a corresponding terminal.

According to a first aspect, the present invention provides a method for acquiring a panoramic image, including:

after a panorama shooting instruction triggered by a user is acquired, shooting a first image, and acquiring a shooting parameter of the first image;

determining move guiding information according to a preset move guiding policy, and displaying the move guiding information on a terminal, so as to instruct the user to move the terminal according to the move guiding information;

shooting a preset quantity of images according to the shooting parameter of the first image after it is detected that the terminal moves, where the preset quantity of images are background images on both the left and right sides of a background corresponding to the first image; and performing, by using the first image as a center and by using a preset splicing scheme, seamless splicing on the first image and the preset quantity of images, to obtain a panoramic image.

With reference to the first aspect, in a first possible implementation manner, the determining move guiding information according to a preset move guiding policy, and displaying the move guiding information on a terminal, so as to instruct the user moves the terminal according to the move guiding information includes:

determining a shooting position of a next image according to the preset move guiding policy, and displaying the shooting position of the next image on the terminal; and correspondingly, the shooting a preset quantity of images according to the shooting parameter of the first image after it is detected that the terminal moves, where the preset quantity of images are background images on both the left and right sides of a background corresponding to the first image includes:

shooting the next image according to the shooting parameter of the first image after the terminal moves to the shooting position of the next image, and repeating the foregoing determining, displaying and shooting steps, until the preset quantity of images are shot.

With reference to the first possible implementation manner of the first aspect, in a second possible implementation manner, after the displaying the shooting position of the next image on the terminal, the method further includes:

acquiring and displaying a position of the terminal in real time when the terminal is moving; and correspondingly, the shooting the next image according to the shooting parameter of the first image after the terminal moves to the shooting position of the next image includes:

shooting the next image according to the shooting parameter of the first image when the displayed position of the terminal is the same as the shooting position of the next image.

With reference to the second possible implementation manner of the first aspect, in a third possible implementation manner, the acquiring and displaying a position of the terminal in real time when the terminal is moving includes:

when the terminal is moving, acquiring and displaying, in real time, a position of the terminal in a moving process by detecting a relative motion of images of adjacent frames, so as to instruct the user to move the terminal to a position for acquiring the next image.

With reference to the second or third possible implementation manner of the first aspect, in a fourth possible implementation manner, after the shooting a first image, and acquiring a shooting parameter of the first image, the method further includes:

performing central position calibration at an interval of preset frames of images, where the central position calibration is to compare a current preview image with the first image, and when a matching similarity between the current preview image and the first image is higher than a preset threshold, determine that the position of the terminal returns to a position of the terminal at which the first image is shot, so as to restart, when the position of the terminal fails to be detected, shooting according to the position at which the first image is shot.

With reference to any one of the first to fourth possible implementation manners of the first aspect, in a fifth possible implementation manner, before the shooting a first image, and acquiring a shooting parameter of the first image, the method further includes:

locking automatic white balance AWB control and automatic exposure AE control, so that shooting parameters of the preset quantity of shot images keep consistent with the shooting parameter of the first image.

With reference to any one of the first to fifth possible implementation manners of the first aspect, in a sixth possible implementation manner, the performing, by using the first image as a center and by using a preset splicing scheme, seamless splicing on the first image and the preset quantity of images, to obtain a panoramic image includes:

detecting positions of person images in both the first image and the preset quantity of images; and when image splicing is performed by using the preset splicing scheme, performing splicing from a position of a non-person image in each image.

According to a second aspect, the present invention provides a terminal, including:

an acquiring unit, configured to acquire a panorama shooting instruction triggered by a user;

a shooting unit, configured to shoot a first image after the acquiring unit acquires the panorama shooting instruction triggered by the user; where the acquiring unit is further configured to acquire a shooting parameter of the first image when the shooting unit shoots the first image;

a determining unit, configured to determine move guiding information according to a preset move guiding policy after the acquiring unit acquires the first image;

a display unit, configured to display, on the terminal, the move guiding information determined by the determining unit, so as to instruct the user to move the terminal according to the move guiding information;

a detecting unit, configured to detect a moving status of the terminal; where the shooting unit is further configured to shoot a preset quantity of images according to the shooting parameter of the first image after the detecting unit detects that the terminal moves, where the preset quantity of images are background images on both the left and right sides of a background corresponding to the first image; and a splicing unit, configured to perform, by using the first image as a center and by using a preset splicing scheme, seamless splicing on the first image and the preset quantity of images that are shot by the shooting unit, to obtain a panoramic image.

With reference to the second aspect, in a first possible implementation manner, the determining unit is configured to determine a shooting position of a next image according to the preset move guiding policy;

the display unit is configured to display the shooting position of the next image on the terminal;

the detecting unit is configured to detect whether the terminal moves to the shooting position that is of the next image and displayed by the display unit;

the shooting unit is configured to shoot the next image according to the shooting parameter of the first image after the terminal moves to the shooting position of the next image; and the determining unit, the display unit, the detecting unit, and the shooting unit repeat the foregoing determining, displaying and shooting steps, until the preset quantity of images are shot.

With reference to the first possible implementation manner of the second aspect, in a second possible implementation manner, the acquiring unit is further configured to acquire a position of the terminal in real time when the terminal is moving;

the display unit is further configured to display, in real time, the position of the terminal that is acquired by the acquiring unit;

the detecting unit is configured to detect whether the position of the terminal that is displayed by the display unit is the same as the shooting position of the next image; and the shooting unit is configured to shoot the next image according to the shooting parameter of the first image when the position of the terminal that is displayed by the display unit is the same as the shooting position of the next image.

With reference to the second possible implementation manner of the second aspect, in a third possible implementation manner, the acquiring unit is configured to: when the terminal is moving, acquire, in real time, a position of the terminal in a moving process by detecting a relative motion of images of adjacent frames, so as to instruct the user to move the terminal to a position for acquiring the next image; and the display unit is configured to display the position of the terminal in the moving process that is acquired by the acquiring unit.

With reference to the second or third possible implementation manner of the second aspect, in a fourth possible implementation manner, the terminal further includes:

a calibration unit, configured to: after the shooting unit shoots the first image, perform central position calibration at an interval of preset frames of images, where the central position calibration is to compare a current preview image with the first image, and when a matching similarity between the current preview image and the first image is higher than a preset threshold, determine that the position of the terminal returns to a position of the terminal at which the first image is shot, so as to restart, when the position of the terminal fails to be detected, shooting according to the position at which the first image is shot.

With reference to the second aspect and any one of the first to fourth possible implementation manners of the second aspect, in a fifth possible implementation manner, the terminal further includes:

a locking unit, configured to, before the shooting unit shoots the first image, lock automatic white balance AWB control and automatic exposure AE control, so that shooting parameters of the preset quantity of shot images keep consistent with the shooting parameter of the first image.

With reference to the second aspect and any one of the first to fifth possible implementation manners of the second aspect, in a sixth possible implementation manner, the splicing unit includes:

a detecting subunit, configured to detect positions of person images in both the first image and the preset quantity of images; and a splicing subunit, configured to: when image splicing is performed by using the preset splicing scheme, perform splicing from a position, detected by the detecting subunit, of a non-person image in each image.

According to a third aspect, the present invention provides a terminal, where the terminal includes a receiver, a transmitter, a camera, a processor and a memory;

the camera is configured to shoot an image;

the receiver is configured to receive a panorama shooting instruction triggered by a user; and the processor is configured to:

after the panorama shooting instruction triggered by the user is acquired, shoot a first image, and acquiring a shooting parameter of the first image;

determine move guiding information according to a preset move guiding policy, and display the move guiding information on the terminal, so as to instruct the user to move the terminal according to the move guiding information;

shoot a preset quantity of images according to the shooting parameter of the first image after it is detected that the terminal moves, where the preset quantity of images are background images on both the left and right sides of a background corresponding to the first image; and perform, by using the first image as a center and by using a preset splicing scheme, seamless splicing on the first image and the preset quantity of images, to obtain a panoramic image.

According to the embodiments of the present invention, after a panorama shooting instruction triggered by a user is acquired, a first image is shot, and a shooting parameter of the first image is acquired; move guiding information is determined according to a preset move guiding policy, and the move guiding information is displayed on a terminal, so as to instruct the user to move the terminal according to the move guiding information. After it is detected that the terminal moves, a preset quantity of images are shot according to the shooting parameter of the first image, where the preset quantity of images are background images on both the left and right sides of a background corresponding to the first image, and seamless splicing is performed, by using the first image as a center and by using a preset splicing scheme, on the first image and the preset quantity of images, to obtain a panoramic image. Compared with the prior art in which an image at a central position cannot be highlighted during panorama shooting, in the method provided in the embodiments of the present invention, an image at a central position can be highlighted during panorama shooting, thereby improving an overall effect of the panoramic image.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings without creative efforts.

DESCRIPTION OF EMBODIMENTS

Embodiments of the present invention provide a method for acquiring a panoramic image, which can highlight an image at a central position during panorama shooting, thereby improving an overall effect of the panoramic image. Embodiments of the present invention further provide a corresponding terminal. Detailed descriptions are made in the following.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Solutions to acquiring a panoramic image provided in the embodiments of the present invention are applicable to a rear-facing shooting mode and a front-facing shooting mode, and in particular, to the front-facing shooting mode.

Figure 1:
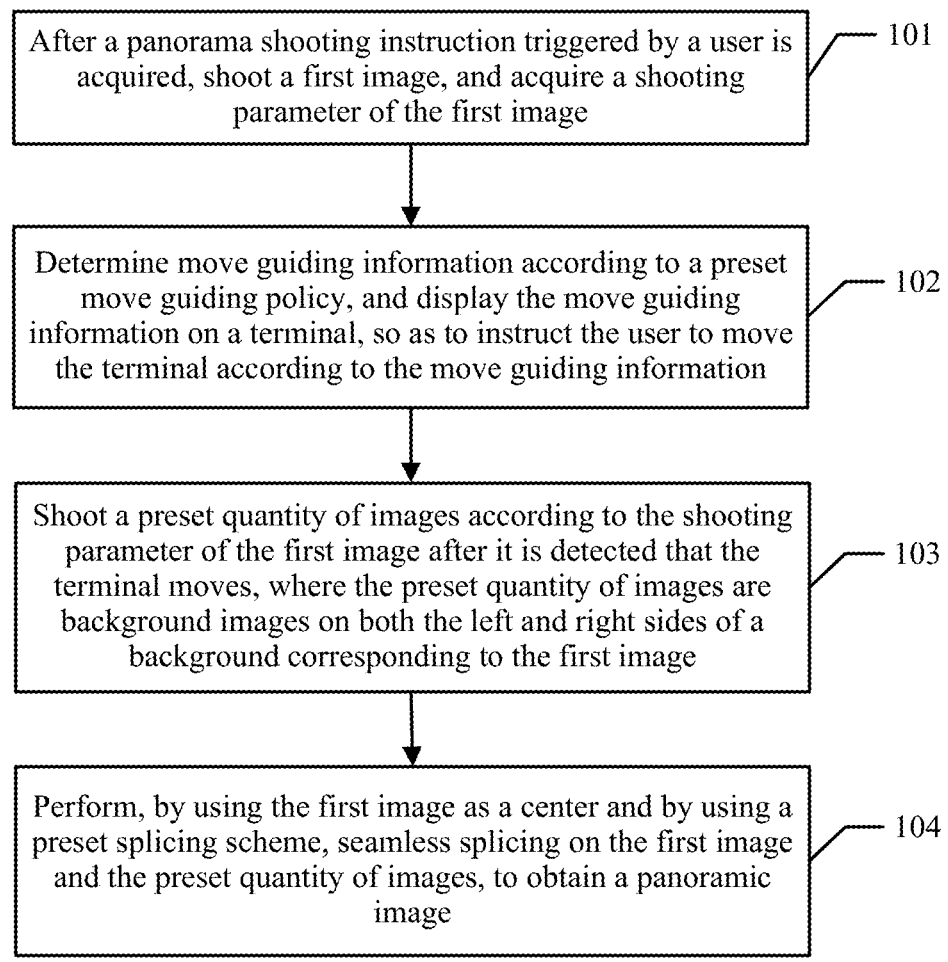
FIG. 1 is a schematic diagram of a method for acquiring a panoramic image according to an embodiment of the present invention.

Referring to FIG. 1, a method for acquiring a panoramic image provided in an embodiment of the present invention includes the following steps:

101. After a panorama shooting instruction triggered by a user is acquired, shoot a first image, and acquire a shooting parameter of the first image.

When panorama shooting is required, a terminal shoots a first image after a panorama shooting instruction triggered by a user is acquired, and simultaneously acquires a shooting parameter of the first image in order to ensure that parameters such as exposure control and white balance control of other subsequent images are the same as those of the first image.

102. Determine move guiding information according to a preset move guiding policy, and display the move guiding information on a terminal, so as to instruct the user to move the terminal according to the move guiding information.

The preset move guiding policy in this embodiment of the present invention may be: to first move or rotate toward the left side of an initial position of the terminal, and then move or rotate toward the right side of the initial position of the terminal The move guiding information may be icon guiding information, or may be text guiding information. A position to which a terminal should move may be displayed on the terminal 103. Shoot a preset quantity of images according to the shooting parameter of the first image after it is detected that the terminal moves, where the preset quantity of images are background images on both the left and right sides of a background corresponding to the first image.

During front-facing panorama shooting, when the terminal rotates to the left side of the initial position, an image on the right side of the background of the first image may be shot, and when the terminal rotates to the right side of the initial position, an image on the left side of the background of the first image may be shot.

The preset quantity may be 4; when rotating to the left side of the initial position, the terminal shoots two images; and when rotating to the right side of the initial position, the terminal shoots two images. Alternatively, the preset quantity may be 2, one image on the left side and the other on the right side. The preset quantity is not limited, and may be set as required.

For example, a user wants to take a selfie, the user holds a mobile phone to focus on the user to shoot an image, and this image is labeled "C". The user rotates the mobile phone toward the left side of a position at which the image C is shot, to successively shoot two images: an image B and an image A; and then rotates the mobile phone toward the right side of the position at which the image C is shot, to shoot two images: an image D and an image E. In this way, five images are acquired, that is, the image A to the image E.

104. Perform, by using the first image as a center and by using a preset splicing scheme, seamless splicing on the first image and the preset quantity of images, to obtain a panoramic image.

An image splicing technology is to splice multiple images into an image with a large visual angle. The example in step 103 is still used. The image A to the image E are spliced according to a sequence of A, B, C, D, and E or a sequence of E, D, C, B, and A, so that a panoramic image in which the image C is in a center may be obtained.

The image splicing solution in this embodiment of the present invention belongs to the prior art. For example, splicing may be performed by using a method such as a template matching method, an adjacency column ratio matching method, a fast grid-based matching method, or a local entropy difference-based image matching method.

According to this embodiment of the present invention, after a panorama shooting instruction triggered by a user is acquired, a first image is shot, and a shooting parameter of the first image is acquired, move guiding information is determined according to a preset move guiding policy, and the move guiding information is displayed on a terminal, so as to instruct the user to move the terminal according to the move guiding information. After it is detected that the terminal moves, a preset quantity of images are shot according to the shooting parameter of the first image, where the preset quantity of images are background images on both the left and right sides of a background corresponding to the first image, and seamless splicing is performed, by using the first image as a center and by using a preset splicing scheme, on the first image and the preset quantity of images, to obtain a panoramic image. Compared with the prior art in which an image at a central position cannot be highlighted during panorama shooting, in the method provided in this embodiment of the present invention, an image can be highlighted at a central position during panorama shooting, thereby improving an overall effect of the panoramic image.

Optionally, based on the embodiment corresponding to FIG. 1 in the foregoing, in another embodiment of a method for acquiring a panoramic image provided in an embodiment of the present invention, the determining move guiding information according to a preset move guiding policy, and displaying the move guiding information on a terminal, so as to instruct the user to move the terminal according to the move guiding information may include:

determining a shooting position of a next image according to the preset move guiding policy, and displaying the shooting position of the next image on the terminal;

correspondingly, the shooting a preset quantity of images according to the shooting parameter of the first image after it is detected that the terminal moves, where the preset quantity of images are background images on both the left and right sides of a background corresponding to the first image includes:

shooting the next image according to the shooting parameter of the first image after the terminal moves to the shooting position of the next image; and repeating the foregoing determining, displaying and shooting steps, until the preset quantity of images are shot.

In this embodiment of the present invention, if the preset move guiding policy instructs to first move or rotate toward the left side of the initial position, the terminal determines that the shooting position of the next image is on the left side of the initial position, and displays the shooting position of the next image in a display interface of the terminal.

The user may move or rotate the terminal according to a prompt in the display interface of the terminal, and when the terminal rotates to the shooting position of the next image, the terminal automatically shoots the next image. In this way, each time when an image is shot, a shooting position of a next image is displayed in the display interface of the terminal, and images can be shot until the preset quantity of background images on both the left and right sides of the background corresponding to the first image are shot, as long as the user moves or rotates the terminal according to the prompt in the display interface of the terminal For example, referring to FIG. 2, a user takes a selfie in a panorama shooting mode, and the user holds a mobile phone to focus the user to shoot a first image. The mobile phone instructs, according to a preset move guiding policy, to rotate the mobile phone leftward, so as to complete shooting a second image. In addition, a small ball and a small circle are displayed in a display interface of the mobile phone, where an arrow points from the small circle to the small ball, the small ball is used to indicate a shooting position of a next image, and the small circle is used to indicate an initial position of the mobile phone at which the first image is shot. A direction of the arrow indicates that the mobile phone needs to rotate leftward. In this way, the user can rotate the mobile phone leftward according to a prompt in the display interface. When the small circle moves to a position of the small ball, the small circle overlaps with the small ball, and the mobile phone automatically shoots the second image. After the second image is shot, the mobile phone further displays a shooting position of a third image. The user needs only to rotate the mobile phone according to a prompt in the display interface; then, shooting of a required image can be completed.

Figure 3A:
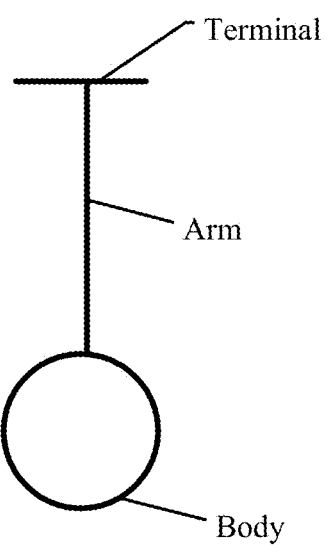
FIG. 3A to FIG. 3C are schematic diagrams of a method for acquiring a panoramic image according to another embodiment of the present invention.
Figure 3B:
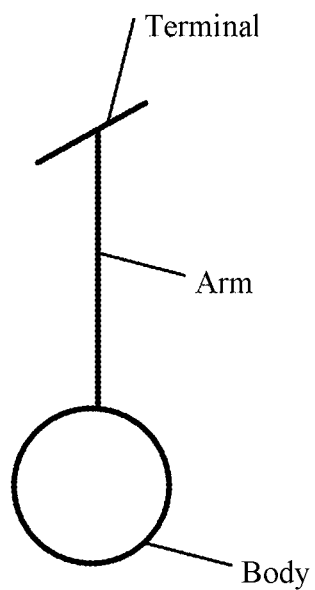
Figure 3C:
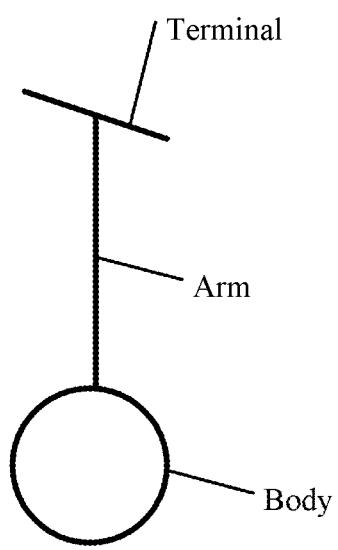

Referring to FIG. 3A, the circle shown in FIG. 3A indicates the body of a user who uses a terminal to take a selfie, the vertical line indicates an arm of the user, and the horizontal line indicates the terminal. FIG. 3A is a schematic diagram of a relationship between the terminal and the user when the user shoots a first image. After the first image is shot, the terminal needs to rotate leftward to shoot a second image; then, the user may rotate the terminal leftward, but the arm does not need to move. As shown in FIG. 3B, after the terminal rotates to a shooting position of the second image, the second image may be shot. After the second image is shot, the terminal needs to rotate rightward to shoot a third image; then, the user may rotate the terminal the rightward. When rotating to a shooting position, shown in FIG. 3C, of the third image, the terminal may shoot the third image.

Optionally, based on the optional embodiment corresponding to FIG. 1 in the foregoing, in another embodiment of a method for acquiring a panoramic image provided in an embodiment of the present invention, after the displaying the shooting position of the next image on the terminal, the method may further include:

acquiring and displaying a position of the terminal in real time when the terminal is moving; and correspondingly, the shooting the next image according to the shooting parameter of the first image after the terminal moves to the shooting position of the next image may include:

shooting the next image according to the shooting parameter of the first image when the displayed position of the terminal is the same as the shooting position of the next image.

Figure 2:
FIG. 2 is a schematic diagram of a method for acquiring a panoramic image according to another embodiment of the present invention.

In this embodiment of the present invention, referring to FIG. 2, when the user rotates the mobile phone, the mobile phone acquires and displays a position of the mobile phone in a rotating process in real time, that is, a position change of the small circle is displayed, in real time, on the mobile phone in a rotating process of the mobile phone, so as to help the user determine how much the mobile phone should be rotated to enable the small circle to overlap with the small ball. When positions of the small circle and the small ball overlap with each other, the mobile phone automatically acquires a next image.

Optionally, based on the optional embodiment corresponding to FIG. 1 in the foregoing, in another embodiment of a method for acquiring a panoramic image provided in an embodiment of the present invention, the acquiring and displaying a position of the terminal in real time when the terminal is moving may include:

when the terminal is moving, acquiring and displaying, in real time, a position of the terminal in a moving process by detecting a relative motion of images of adjacent frames, so as to instruct the user to move the terminal to a position for acquiring the next image.

In this embodiment of the present invention, after the first image is shot, the mobile phone needs to rotate to a position of a next image to shot the next image. Actually, from the time when a shooting mode is enabled, the user cannot capture an image according to a frame rate. For example, when the frame rate is 30 frames/second, the terminal captures one frame at an interval of 1/30 seconds, and the terminal can determine, according to a difference between two images of adjacent frames, how much the terminal moves, to determine a position of the terminal in a moving process, and display the determined position on the terminal, so as to instruct the user to move the terminal to the shooting position of the next image.

Optionally, based on the optional embodiment corresponding to FIG. 1 in the foregoing, in another embodiment of a method for acquiring a panoramic image provided in an embodiment of the present invention, after the shooting a first image, and acquiring a shooting parameter of the first image, the method may further include:

performing central position calibration at an interval of preset frames of images, where the central position calibration is to compare a current preview image with the first image, and when a matching similarity between the current preview image and the first image is higher than a preset threshold, determine that the position of the terminal returns to a position of the terminal at which the first image is shot, so as to restart, when the position of the terminal fails to be detected, shooting according to the position at which the first image is shot.

In this embodiment of the present invention, the preset frames of images may be 10 frames, that is, central position calibration is performed at an interval of 10 frames. An objective of central position calibration is to: when the terminal fails to detect a position of the terminal, find a position at which the first image is shot. In this way, shooting can be restarted.

The preset threshold may be 80% or 90%, or may be another value because the first image is generally shot by focusing on the face of a person. When the similarity between the preview image and the first image is higher than the preset threshold, it may be determined that the terminal returns to the position at which the first image is shot.

Optionally, based on the embodiment corresponding to FIG. 1 or any optional embodiment corresponding to FIG. 1 in the foregoing, in another embodiment of a method for acquiring a panoramic image provided in an embodiment of the present invention, before the shooting a first image, and acquiring a shooting parameter of the first image, the method may further include:

locking automatic white balance (Automatic White Balance, AWB) control and automatic exposure (Automatic Exposure, AE) control, so that shooting parameters of the preset quantity of shot images keep consistent with the shooting parameter of the first image.

To collect multiple images during panorama shooting, an exposure setting and a white balance setting need to be locked according to exposure and white balance settings corresponding to the first image. By first shooting an image in the middle, it can be ensured that the locked exposure and white balance settings better render the face of a person. If an image is shot on the left side first, generally, luminance of an outdoor background is remarkably greater than luminance of the face of a person, which causes that the face of the person is too dark.

Optionally, based on the embodiment corresponding to FIG. 1 or any optional embodiment corresponding to FIG. 1 in the foregoing, in another embodiment of a method for acquiring a panoramic image provided in an embodiment of the present invention, the performing, by using the first image as a center and by using a preset splicing scheme, seamless splicing on the first image and the preset quantity of images, to obtain a panoramic image may include:

detecting positions of person images in both the first image and the preset quantity of images; and when image splicing is performed by using the preset splicing scheme, performing splicing from a position of a non-person image in each image.

In this embodiment of the present invention, to ensure a splicing effect, a person image should be maximally prevented from being spliced, image points with a low gradient in an image are selected, and an area in which the face of a person is located should be maximally avoided.

During image splicing, a characteristic point in each image may be extracted, where a scale-invariant feature transform (Scale-invariant feature transform, SIFT) extracting method, a characteristic point extracting method, or an angular point extracting method may be used to extract a characteristic point. The SIFT extracting method and the angular point extracting method belong to the well-known technology in the field of image processing, and details are not described in this embodiment.

After characteristic points are extracted, characteristic points extracted from different images are compared, and characteristic points representing a same image character are matched. SIFT characteristic point matching may be used, or image block matching may be used. The SIFT characteristic point matching and the image block matching belong to the well-known technology in the field of image processing, and details are not described in this embodiment.

After the characteristic points are matched, a characteristic point pair is selected, a characteristic point pair representing same image transform is retained, a characteristic point pair representing other image transform is removed, and a random sample consensus (Random Sample Consensus, RANSAC) algorithm may be used. A transform matrix between two images may also be calculated according to the selected characteristic point pair by transforming a matrix.

After an image is rotated according to a transform matrix, a position of the face of a person is detected, so as to prevent an area in which the face of the person is located to select the characteristic point pair from being spliced. An iterative algorithm ADABOOST algorithm may be used, or a FLOATBOOST algorithm may be used. These algorithms belong to the well-known technology in the field, and details are not described herein.

A splicing seam between two images is searched for, and the images are seamed. The images may be seamed by using a seam carving technology. The seam carving technology belongs to the well-known technology, and details are not described herein. During selection of the splicing seam, image points with a low gradient in an image are selected, and an area in which the face of a person is located should be maximally avoided.

Figure 4:
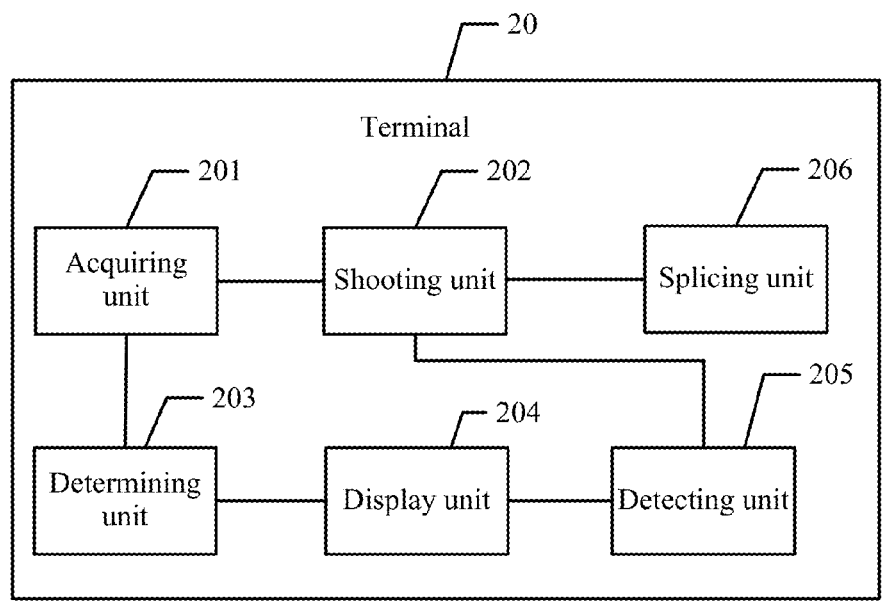
FIG. 4 is a schematic diagram of a terminal according to an embodiment of the present invention.

Referring to FIG. 4, a terminal provided in an embodiment of the present invention includes:

an acquiring unit 201, configured to acquire a panorama shooting instruction triggered by a user;

a shooting unit 202, configured to shoot a first image after the acquiring unit 201 acquires the panorama shooting instruction triggered by the user; where the acquiring unit 201 is further configured to acquire a shooting parameter of the first image when the shooting unit shoots the first image;

a determining unit 203, configured to determine move guiding information according to a preset move guiding policy after the acquiring unit 201 acquires the first image;

a display unit 204, configured to display, on the terminal, the move guiding information determined by the determining unit 203, so as to instruct the user to move the terminal according to the move guiding information;

a detecting unit 205, configured to detect a moving status of the terminal after the display unit 204 displays the move guiding information; where the shooting unit 202 is further configured to shoot a preset quantity of images according to the shooting parameter of the first image after the detecting unit 205 detects that the terminal moves, where the preset quantity of images are background images on both the left and right sides of a background corresponding to the first image; and a splicing unit 206, configured to perform, by using the first image as a center and by using a preset splicing scheme, seamless splicing on the first image and the preset quantity of images that are shot by the shooting unit 202, to obtain a panoramic image.

According to this embodiment of the present invention, an acquiring unit 201 acquires a panorama shooting instruction triggered by a user; a shooting unit 202 shoots a first image after the acquiring unit 201 acquires the panorama shooting instruction triggered by the user; the acquiring unit 201 further acquires a shooting parameter of the first image when the shooting unit shoots the first image; a determining unit 203 determines move guiding information according to a preset move guiding policy after the acquiring unit 201 acquires the first image; a display unit 204 displays, on a terminal, the move guiding information determined by the determining unit 203, so as to instruct the user to move the terminal according to the move guiding information; a detecting unit 205 detects a moving status of the terminal after the display unit 204 displays the move guiding information; the shooting unit 202 further shoots a preset quantity of images according to the shooting parameter of the first image after the detecting unit 205 detects that the terminal moves, where the preset quantity of images are background images on both the left and right sides of a background corresponding to the first image; a splicing unit 206 performs, by using the first image as a center and by using a preset splicing scheme, seamless splicing on the first image and the preset quantity of images that are shot by the shooting unit 202, to obtain a panoramic image. Compared with the prior art in which an image at a central position cannot be highlighted during panorama shooting, the terminal provided in this embodiment of the present invention can highlight an image at a central position during panorama shooting, thereby improving an overall effect of the panoramic image.

Optionally, based on the embodiment corresponding to FIG. 4 in the foregoing, in another embodiment of a terminal provided in an embodiment of the present invention, the determining unit 203 is configured to determine a shooting position of a next image according to the preset move guiding policy;

the display unit 204 is configured to display the shooting position of the next image on the terminal;

the detecting unit 205 is configured to detect whether the terminal moves to the shooting position that is of the next image and displayed by the display unit 204;

the shooting unit 202 is configured to shoot the next image according to the shooting parameter of the first image after the detecting unit 205 detects that the terminal moves to the shooting position of the next image; and the determining unit 203, the detecting unit 205, the display unit 204, and the shooting unit 202 repeat the foregoing determining, displaying and shooting steps, until the preset quantity of images are shot.

Figure 5:
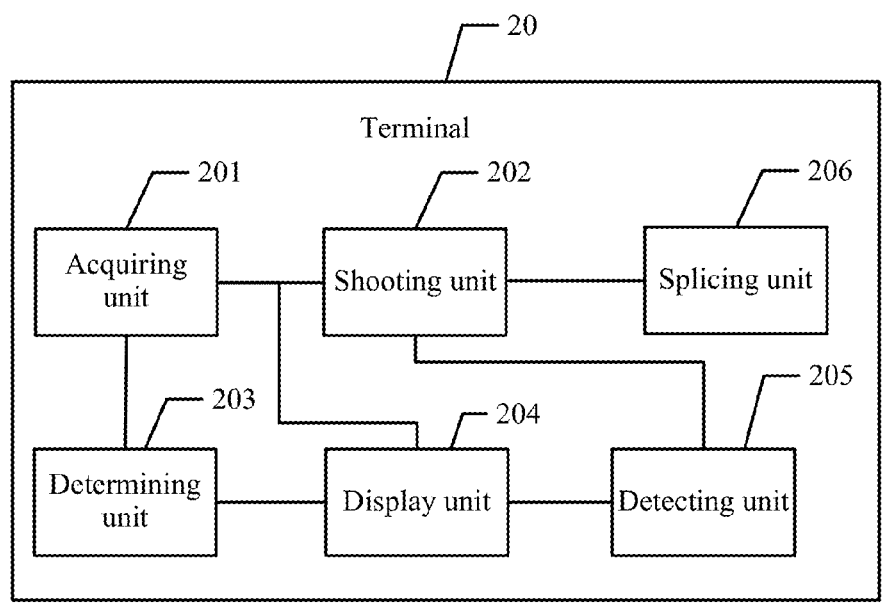
FIG. 5 is a schematic diagram of a terminal according to another embodiment of the present invention.

Optionally, based on the embodiment corresponding to FIG. 4 in the foregoing, referring to FIG. 5, in another embodiment of a terminal provided in an embodiment of the present invention, the acquiring unit 201 is further configured to acquire a position of the terminal in real time when the terminal is moving;

the display unit 204 is further configured to display, in real time, the position of the terminal that is acquired by the acquiring unit 201; and the detecting unit 205 is configured to detect whether the position of the terminal that is displayed by the display unit 204 is the same as the shooting position of the next image; and the shooting unit 202 is configured to shoot the next image according to the shooting parameter of the first image when the detecting unit 205 detects that the position of the terminal that is displayed by the display unit 204 is the same as the shooting position of the next image.

Optionally, based on the embodiment corresponding to FIG. 5 in the foregoing, in another embodiment of a terminal provided in an embodiment of the present invention, the acquiring unit 201 is configured to: when the terminal is moving, acquire, in real time, a position of the terminal in a moving process by detecting a relative motion of images of adjacent frames, so as to instruct the user to move the terminal to a position for acquiring the next image; and the display unit 204 is configured to display the position of the terminal in the moving process that is acquired by the acquiring unit 201.

Figure 6:
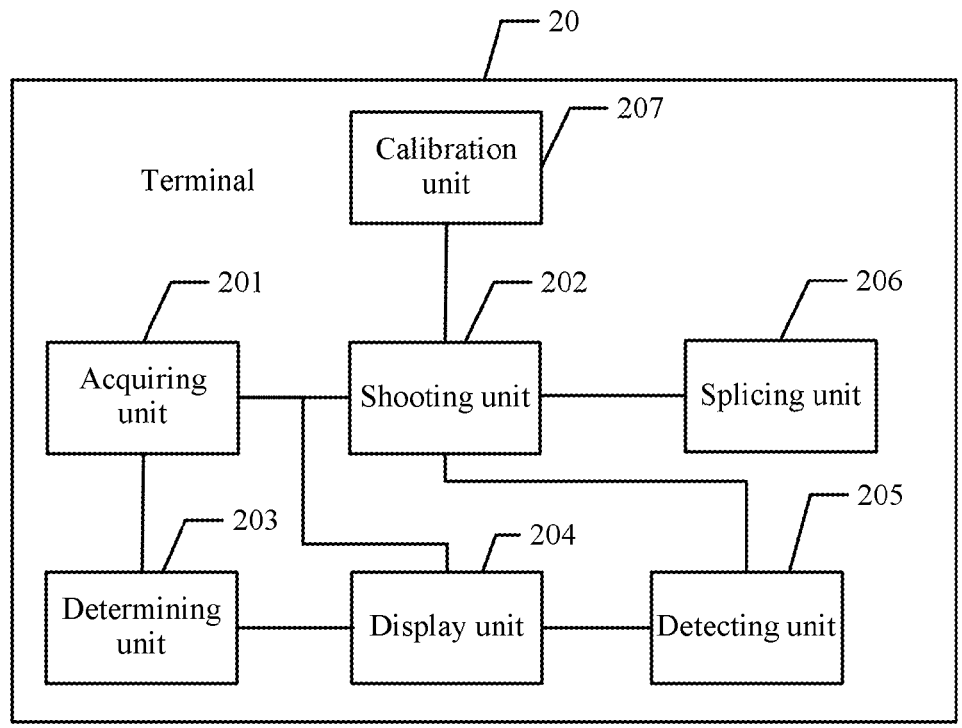
FIG. 6 is a schematic diagram of a terminal according to another embodiment of the present invention.

Optionally, based on the embodiment corresponding to FIG. 5 in the foregoing, referring to FIG. 6, in another embodiment of a terminal provided in an embodiment of the present invention, a terminal 20 further includes:

a calibration unit 207, configured to: after the shooting unit 202 shoots the first image, perform central position calibration at an interval of preset frames of images, where the central position calibration is to compare a current preview image with the first image, and when a matching similarity between the current preview image and the first image is higher than a preset threshold, determine that the position of the terminal returns to a position of the terminal at which the first image is shot, so as to restart, when the position of the terminal fails to be detected, shooting according to the position at which the first image is shot.

Figure 7:
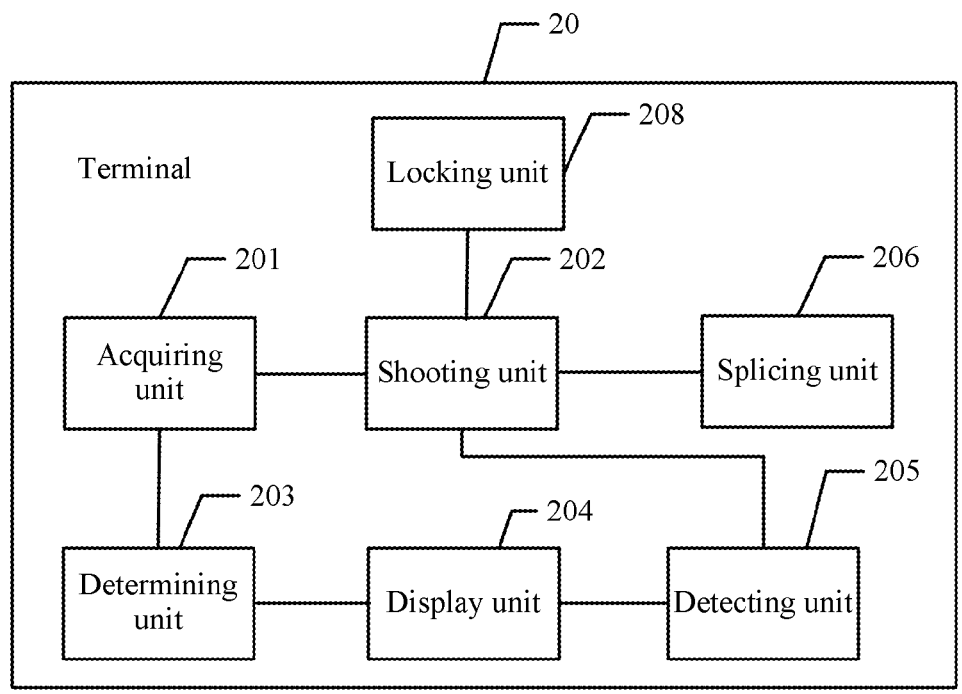
FIG. 7 is a schematic diagram of a terminal according to another embodiment of the present invention.

Optionally, based on the embodiment corresponding to FIG. 4 in the foregoing, referring to FIG. 7, in another embodiment of a terminal provided in an embodiment of the present invention, the terminal 20 further includes:

a locking unit 208, configured to, before the shooting unit 202 shoots the first image, lock automatic white balance AWB control and automatic exposure AE control, so that shooting parameters of the preset quantity of shot images keep consistent with the shooting parameter of the first image.

Figure 8:
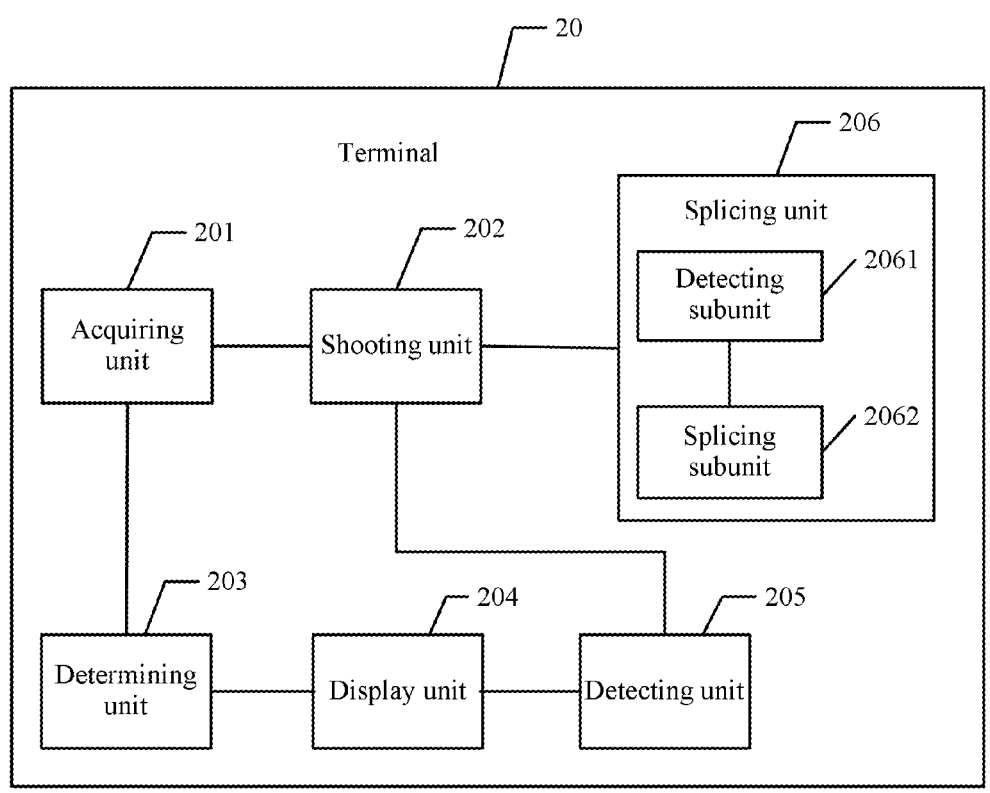
FIG. 8 is a schematic diagram of a terminal according to another embodiment of the present invention.

Optionally, based on the embodiment corresponding to FIG. 4 in the foregoing, referring to FIG. 8, in another embodiment of a terminal provided in an embodiment of the present invention, the splicing unit 206 further includes:

a detecting subunit 2061, configured to detect positions of person images in both the first image and the preset quantity of images; and a splicing subunit 2062, configured to: when image splicing is performed by using the preset splicing scheme, perform splicing from a position, detected by the detecting subunit 2061, of a non-person image in each image.

Figure 9:
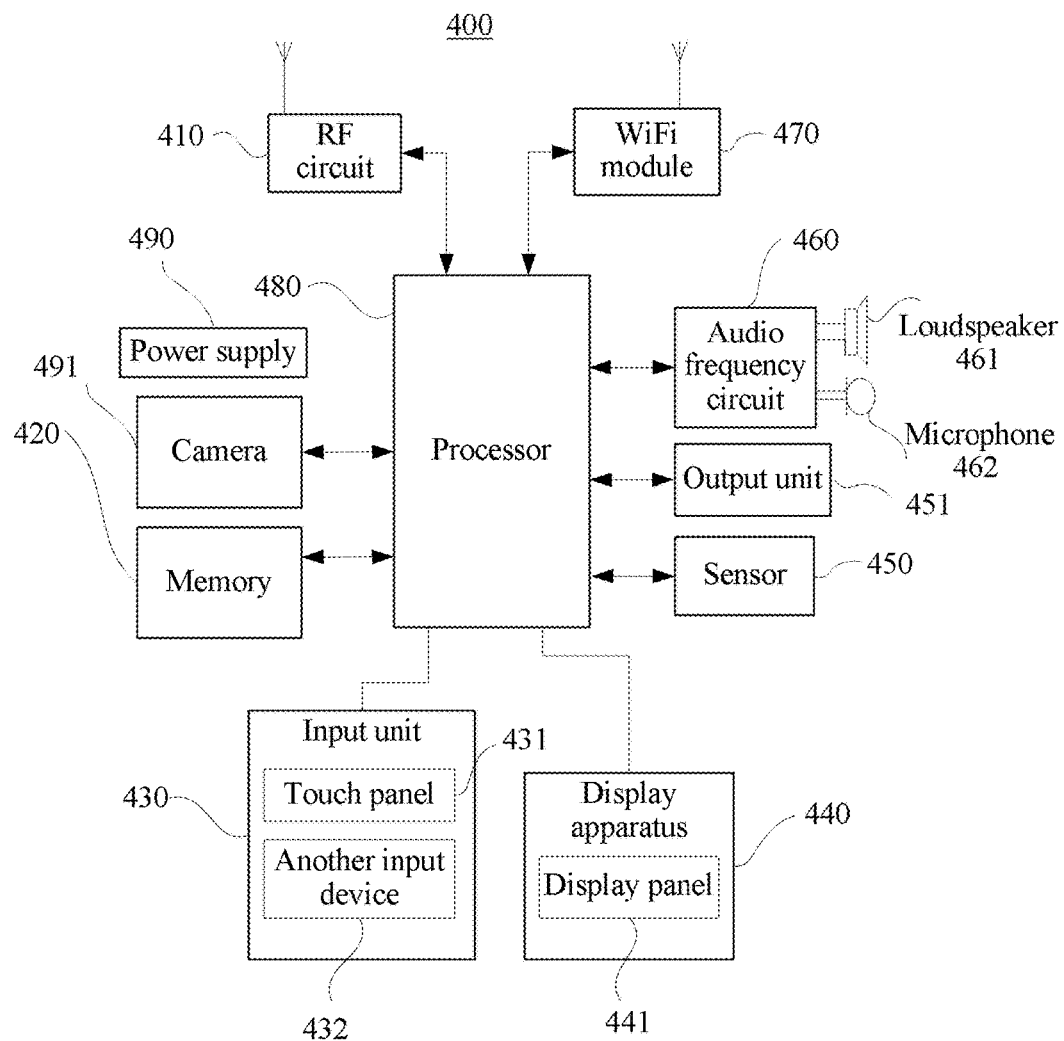
FIG. 9 is a schematic diagram of a terminal according to another embodiment of the present invention.

FIG. 9 shows a structure of a terminal provided in an embodiment of the present invention. The terminal provided in this embodiment of the present invention may be configured to implement the method for acquiring a panoramic image in the embodiments of the present invention. For ease of description, only a part related to this embodiment of the present invention is shown. For specific technology details that are not disclosed, refer to the part in the method embodiments of the present invention for understanding.

The terminal may include terminals such as a mobile phone, a tablet computer, a PDA (Personal Digital Assistant, personal digital assistant), a POS (Point of Sales, point of sales), and a vehicle-mounted computer. For example, the terminal is a mobile phone. FIG. 9 is a block diagram of a partial structure of a mobile phone 400 related to the terminal provided in this embodiment of the present invention. Referring to FIG. 9, the mobile phone 400 includes components such as an RF (Radio Frequency, Radio Frequency) circuit 410, a memory 420, an input unit 430, a display apparatus 440, a sensor 450, an output unit 451, an audio frequency circuit 460, a Wireless Fidelity (Wireless Fidelity, WiFi) module 470, a processor 480, and a power supply 490. A person skilled in the art may understand that, the structure of the mobile phone shown in FIG. 9 constitutes no limitation on the mobile phone, and the mobile phone may include components more or fewer than those shown in FIG. 9, or a combination of some components, or components that are disposed differently.

The components of the mobile phone 400 are described in detail in the following with reference to FIG. 9:

The RF circuit 410 may be configured to: send and receive a signal in an information sending and receiving process or a call process, and especially, after receiving downlink information of a base station, send the downlink information to the processor 480 for processing; in addition, send uplink data to the base station. Generally, the RF circuit 410 includes but is not limited to an antenna, at least one amplifier, a transceiver, a coupler, a low noise amplifier (Low Noise Amplifier, LNA), a duplexer, and the like. In addition, the RF circuit 410 may further communicate with another device by means of wireless communications. The wireless communications may use any communications standard or protocol, which includes but is not limited to a Global System for Mobile Communications (Global System for Mobile communications, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short messaging service (Short Messaging Service, SMS), and the like.

The memory 420 may be configured to store a software program and a software module, the processor 480 executes various function applications and data processing of the mobile phone 400 by running the software program and the software module that are stored in the memory 420. The memory 420 may mainly include a program storage area and a data storage area, where an operating system, an application program required by at least one function (such as a sound playing function and an image playing function), and the like may be stored in the program storage area. Data (such as audio data and an address book) created according to usage of the mobile phone 400 may be stored in the data storage area. In addition, the memory 420 may include a high-speed random access memory, or may include a non-volatile memory, for example, at least one magnetic disk storage device, a flash memory device, or another volatile solid-state memory device.

The input unit 430 may be configured to receive input digital or character information, and generate key signal input related to a setting of a user and function control of the mobile phone 400. Specifically, the input unit 430 may include a touch panel 431 and another input device 432. The touch panel 431 is also referred to as a touchscreen, and can collect a touching operation (for example, an operation performed by the user on the touch panel 431 or near the touch panel 431 by using any appropriate object or accessory such as a finger or a stylus) performed by the user on or near the touchscreen, and drive a corresponding connecting apparatus according to a preset program. Optionally, the touch panel 431 may include two parts: a touch detecting apparatus and a touch controller. The touch detecting apparatus detects a touch direction of the user, detects a signal generated by the touch operation, and sends the signal to the touch controller. The touch controller receives touch information from the touch detecting apparatus, transforms the touch information into contact coordinates, sends the contact coordinates to the processor 480, and can receive a command from the processor 480 and execute the command. In addition, the touch panel 431 may be implemented in various types such as a resistive type, a capacitive type, an infrared type, and a surface acoustic wave type. In addition to the touch panel 431, the input unit 430 may further include another input device 432. Specifically, the another input device 432 may include but is not limited to one or multiple of a physical keyboard, a function key (for example, a volume control key, a switch key, or the like), a trackball, a mouse, and an operating rod.

The display apparatus 440 may be configured to display information triggered by the user, or information provided for the user and various menus of the mobile phone 400. The display apparatus 440 may include a display panel 441, and optionally, may configure the display panel 441 in a form such as a liquid crystal display (Liquid Crystal Display, LCD), or an organic light-emitting diode (Organic Light-Emitting Diode, OLED). Further, the touch panel 431 may cover the display panel 441, and when the touch panel 431 detects a touch operation performed on the touch panel 431, transmit the touch operation to the processor 480 so as to determine a type of a touch event. Then, the processor 480 provides corresponding visual output on the display panel 441 according to the type of the touch event. In FIG. 9, although the touch panel 431 and the display panel 441 serve as two independent components to implement input and output functions of the mobile phone 400, in some embodiments, the touch panel 431 and the display panel 441 may be integrated to implement the input and output functions of the mobile phone 400.

The mobile phone 400 may further include at least one type of sensor 450, such as an optical sensor, a motion sensor, and another sensor. Specifically, the optical sensor may include an ambient light sensor and a proximity sensor, where the ambient light sensor may adjust brightness of the display panel 441 according to lightness and darkness of ambient light, and the proximity sensor may turn off the display panel 441 and/or backlight when the mobile phone 400 moves near an ear. As one type of motion sensor, an acceleration sensor can detect acceleration in various directions (which are based on generally three axes), can detect a value and a direction of the gravity when the mobile phone 400 is in a static state, and can be used in an application for identifying a mobile phone posture (such as switching between a landscape and a portrait, a related game, and magnetometer posture calibration), a vibration identification related function (such as a pedometer and knocking), and the like. For the mobile phone 400, other sensors such as a gyroscope, a barometer, a hygrometer, a thermometer, and an infrared sensor may further be configured, and details are not described herein.

The output unit 451 may be configured to send a signal.

The audio frequency circuit 460, a loudspeaker 461, and a microphone 462 can provide an audio interface between the user and the mobile phone 400. The audio frequency circuit 460 can send, to the loudspeaker 461, an electrical signal that is obtained by converting received audio data, and then the loudspeaker 461 converts the electrical signal into a sound signal for outputting. In another aspect, the microphone 462 converts a collected sound signal into an electrical signal, and then the audio frequency circuit 460 converts the electrical signal into audio data after receiving the electrical signal, and outputs the audio data to the processor 480 for processing. Then the audio data is sent by using the RF circuit 410 to, for example, another mobile phone, or output to the memory 420 for further processing.

WiFi belongs to a short distance wireless transmission technology, the mobile phone 400 can help the user send and receive an email, browse a web page, and access streaming media, and the like by using the WiFi module 470. WiFi provides the user with wireless broadband Internet access. Although FIG. 9 shows the WiFi module 470, it may be understood that, the WiFi mode 470 is not a necessary part of the mobile phone 400, and may be omitted as required without departing from the scope of the essence of the present invention.

The processor 480 is a control center of the mobile phone 400, is connected to various parts of the entire mobile phone by using various interfaces and lines, and executes various functions of the mobile phone 400 and processes data by running or executing a software program and/or module stored in the memory 420 and invoking data stored in the memory 420, so as to perform overall monitoring on the mobile phone. Optionally, the processor 480 may include one or multiple processing units. Preferably, the processor 480 may be integrated with an application processor and a modem processor, where the application processor mainly processes an operating system, a user interface, an application program, and the like. The modem processor mainly processes wireless communications. It may be understood that, the foregoing modem processor may not be integrated into the processor 480.

The mobile phone 400 further includes the power supply 490 (for example, a battery) that supplies power to various components. Preferably, the power supply may be logically connected to the processor 480 by using a power supply management system, so as to implement functions such as charging, discharging, and power consumption management by using the power supply management system.

The mobile phone 400 may further include a camera 491, where the camera 491 shoots an image.

The mobile phone 400 may further include a Bluetooth module, which is not shown, and details are not described herein.

In this embodiment of the present invention, the processor 480 included in the terminal further has the following functions:

The processor 480 is configured to: after a panorama shooting instruction triggered by a user is acquired, shoot a first image, and acquire a shooting parameter of the first image; determine move guiding information according to a preset move guiding policy, and display the move guiding information on the terminal, so as to instruct the user to move the terminal according to the move guiding information; shoot a preset quantity of images according to the shooting parameter of the first image after it is detected that the terminal moves, where the preset quantity of images are background images on both the left and right sides of a background corresponding to the first image; and perform, by using the first image as a center and by using a preset splicing scheme, seamless splicing on the first image and the preset quantity of images, to obtain a panoramic image.

In this embodiment of the present invention, when a panoramic image is shot, an image in the middle may be shot first, and then images on two sides may be shot, so that an image at a central position can be highlighted, thereby improving an overall effect of the panoramic image.

In some embodiments of the present invention, the processor 480 is further configured to determine a shooting position of a next image according to the preset move guiding policy.

The display apparatus 440 may display the shooting position of the next image on the terminal.

The camera 491 is further configured to shoot the next image according to the shooting parameter of the first image after the terminal moves to the shooting position of the next image.

The processor 480, the display apparatus 440, and the camera 491 repeat the foregoing determining, displaying and shooting steps, until the preset quantity of images are shot.

In some embodiments of the present invention, the processor 480 is further configured to acquire a position of the terminal in real time when the terminal is moving.

The display apparatus 440 may further display the position of the terminal

The processor 480 is further configured to: when the displayed position of the terminal is the same as the shooting position of the next image, trigger the camera 491 to shoot the next image.

The camera 491 is further configured to shoot the next image according to the shooting parameter of the first image.

In some embodiments of the present invention, the processor 480 is further configured to: when the terminal is moving, acquire, in real time, a position of the terminal in a moving process by detecting a relative motion of images of adjacent frames, so as to instruct the user to move the terminal to a position for acquiring the next image.

The display apparatus 440 may display the position of the terminal in the move processing.

In some embodiments of the present invention, the processor 480 is further configured to perform central position calibration at an interval of preset frames of images, where the central position calibration is to compare a current preview image with the first image, and when a matching similarity between the current preview image and the first image is higher than a preset threshold, determine that the position of the terminal returns to a position of the terminal at which the first image is shot, so as to restart, when the position of the terminal fails to be detected, shooting according to the position at which the first image is shot.

In some embodiments of the present invention, the processor 480 is further configured to lock automatic white balance AWB control and automatic exposure AE control, so that shooting parameters of the preset quantity of shot images keep consistent with the shooting parameter of the first image.

In some embodiments of the present invention, the processor 480 is further configured to detect positions of person images in both the first image and the preset quantity of images, and when image splicing is performed by using the preset splicing scheme, perform splicing from a position of a non-person image in each image.

A person of ordinary skill in the art may understand that all or a part of the steps of the methods in the foregoing embodiments may be implemented by a program instructing relevant hardware. The program may be stored in a computer readable storage medium. The storage medium may include: a ROM, a RAM, a magnetic disk, or an optical disc.

The method and terminal for acquiring a panoramic image provided in the embodiments of the present invention are described in detail in the following. This specification describes principles and implementation manners of the present invention by using specific examples. Descriptions of the foregoing embodiments are merely intended to help understand the method and its core idea of the present invention. Meanwhile, a person of ordinary skill in the art may make variations to a specific implementation manner and an application scope according to the idea of the present invention. In conclusion, content of this specification should not be construed as a limitation on the present invention.

What is claimed is:

1. A method for acquiring a panoramic image of a user by a mobile terminal having a front camera and a display on a front side of the mobile terminal, the method comprising:
    receiving a user instruction to take a panoramic image from the user;
    shooting a center image including the user with the front camera while the front camera is facing the user;
    after shooting the center image, according to a shooting instruction on the display, shooting a first side image with the front camera when the mobile terminal is rotated to have the front camera turned away from the user to face a background on a first side of the user, such that the user is not in a center portion of the first side image;
    according the shooting instruction on the display, shooting a second side image with the front camera while the mobile terminal is rotated to have the front camera turned away from the user to face a background on a second side of the user, the second side being opposite to the first side, such that the user is not in a center portion of the second side image; and
    splicing the center image, the first side image, and the second side image to obtain a panoramic image with the user at a center of the panoramic image.

2. The method according to claim 1, wherein the shooting instruction comprises a textual instruction to instruct the user to rotate the mobile terminal away from the user and toward the first side or second side of the user.

3. The method according to claim 2, wherein the shooting instruction further comprises a graphical indicator displayed in conjunction with the textual instruction to instruct the user to rotate the mobile terminal.

4. The method according to claim 3, further comprising:
    displaying a preview window showing a current view captured by the front camera, wherein the current view displayed in the preview window is updated as the mobile terminal is rotated.

5. The method according to claim 4, further comprising:
    detecting a face of the user in the center image;
    wherein the splicing of the center image, the first side image, and the second side image is based on overlapping regions located outside the face of the user in the center image.

6. The method according to claim 1, wherein after shooting the center image and before shooting the first side image, the method further comprises:
    locking at least one of automatic white balance AWB or automatic exposure AE of the center image for shooting the first side and second side images.

7. A mobile terminal, comprising:
    a display on a front side of the mobile terminal;
    a front camera on the front side of the mobile terminal;
    a processor; and
    a memory storing executable instructions;
    the processor being configured to execute the executable instructions to:
    receive a user instruction to take a panoramic image from a user;
    shoot a center image of the user with the front camera while the front camera is facing the user;
    after shooting the center image, according to a shooting instruction on the display, shoot a first side image with the front camera when the mobile terminal is rotated to have the front camera turned away from the user to face a background on a first side of the user, such that the user is not in a center portion of the first side image;

according the shooting instruction on the display, shoot a second side image with the front camera while the mobile terminal is rotated to have the front camera turned away from the user to face a background on a second side of the user, the second side being opposite to the first side, such that the user is not in a center portion of the second side image; and splice the center image, the first side image, and the second side image to obtain a panoramic image with the user at a center of the panoramic image.

8. The mobile terminal according to claim 7, wherein the shooting instruction comprises a textual instruction to instruct the user to rotate the mobile terminal away from the user and toward the first side or the second side of the user.

9. The mobile terminal according to claim 8, wherein the shooting instruction further comprises a graphical indicator displayed in conjunction with the textual instruction to instruct the user to rotate the mobile terminal.

10. The mobile terminal according to claim 9, wherein the processor is further configured to:

display a preview window showing a current view captured by the front camera, wherein the current view displayed in the preview window is updated as the mobile terminal is rotated.

11. The mobile terminal according to claim 10, wherein the processor is further configured to:

detect a face of the user in the center image, wherein the splicing of the center image, the first side image, and the second side image are based on overlapping regions located outside the face of the user in the center image.

12. The mobile terminal according to claim 7, wherein after shooting the center image, and before shooting the first side image, the processor is further configured to:

lock at least one of automatic white balance AWB or automatic exposure AE of the center image for shooting the first side and second side images.

13. A non-transitory computer-readable medium having stored thereon computer-executable instructions that when executed by a processor of a mobile terminal causes the mobile terminal to perform operations of:

receiving a user instruction triggered by a user;

shooting a center image including the user with a front camera of the mobile device when the front camera is facing the user, wherein the front camera and a display of the mobile device are located on a front side of the mobile device;

after shooting the center image, according to a shooting instruction on the display, shooting a first side image with the front camera when the mobile terminal is rotated to turn the front camera away from the user to face a background on a first side of the user, such that the user is not in a center portion of the first side image;

according to the shooting instruction on the display, shooting a second side image with the front camera when the mobile terminal is rotated to turn the front camera away from the user to face a background on a second side of the user, the second side being opposite to the first side, such that the user is not in a center portion of the second side image; and splicing the center image, the first side image, and the second side image to obtain a panoramic image with the user at a center of the panoramic image.

* * * * *

UNITED STATES PATENT AND TRADEMARK OFFICE
CERTIFICATE OF CORRECTION

PATENT NO. : 10,277,804 B2
APPLICATION NO. : 14/984316
DATED : April 30, 2019
INVENTOR(S) : Du et al.

Page 1 of 2

It is certified that error appears in the above-identified patent and that said Letters Patent is hereby corrected as shown below:

In the Specification

In Column 10, Lines 18-20, delete "automatic white balance (Automatic White Balance, AWB) control and automatic exposure (Automatic Exposure, AE)" and insert -- Automatic White Balance (AWB) control and Automatic Exposure (AE) --, therefor.

In Column 10, Lines 52-53, delete "scale-invariant feature transform (Scale-invariant feature transform, SIFT)" and insert -- Scale-Invariant Feature Transform (SIFT) --, therefor.

In Column 11, Lines 5-6, delete "random sample consensus (Random Sample Consensus, RANSAC)" and insert -- Random Sample Consensus (RANSAC) --, therefor.

In Column 13, Lines 50-52, delete "PDA (Personal Digital Assistant, personal digital assistant), a POS (Point of Sales, point of sales)," and insert -- PDA (Personal Digital Assistant), a POS (Point of Sales), --, therefor.

In Column 13, Lines 57-58, delete "RF (Radio Frequency, Radio Frequency)" and insert -- RF (Radio Frequency) --, therefor.

In Column 13, Lines 60-61, delete "(Wireless Fidelity, WiFi)" and insert -- (WiFi) --, therefor.

In Column 14, Lines 10-11, delete "low noise amplifier (Low Noise Amplifier, LNA)," and insert -- Low Noise Amplifier (LNA), --, therefor.

In Column 14, Lines 16-23, delete "Global System for Mobile Communications (Global System for Mobile communications, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, a short messaging service (Short Messaging Service, SMS)," and insert -- Global System for Mobile Communications (GSM), a General Packet Signed and Sealed this
Eighteenth Day of October, 2022

Katherine Kelly Vidal
*Director of the United States Patent and Trademark Office*

Radio Service (GPRS), Code Division Multiple Access (CDMA), Wideband Code Division Multiple Access (WCDMA), Long Term Evolution (LTE), an email, a Short Messaging Service (SMS), --, therefor.

In Column 15, Lines 10-12, delete "liquid crystal display (Liquid Crystal Display, LCD), or an organic light-emitting diode (Organic Light-Emitting Diode, OLED)." and insert -- Liquid Crystal Display (LCD), or an Organic Light-Emitting Diode (OLED). --, therefor.